Dec. 26, 1939.   A. E. NORTHUP   2,184,804
VEHICLE BODY CONSTRUCTION
Filed May 21, 1937   2 Sheets-Sheet 1
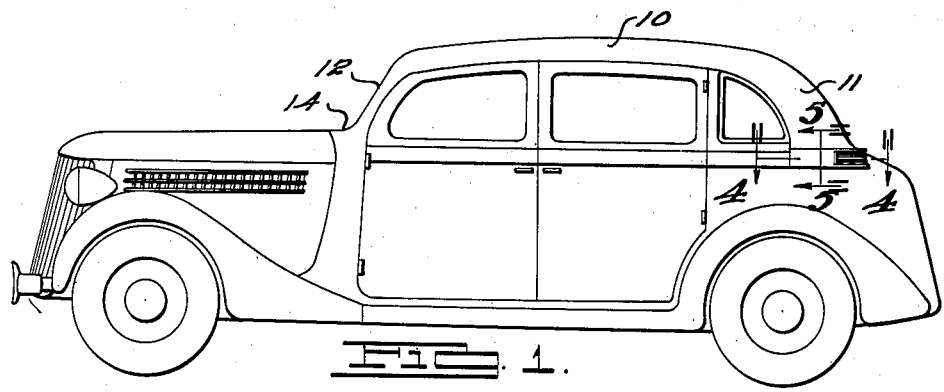
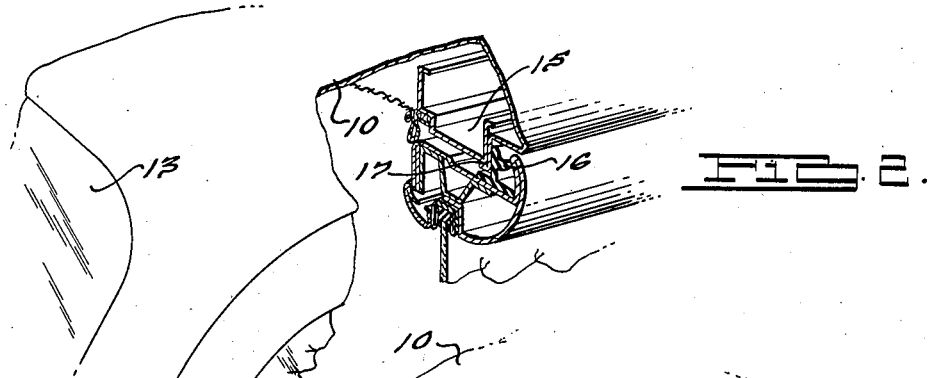
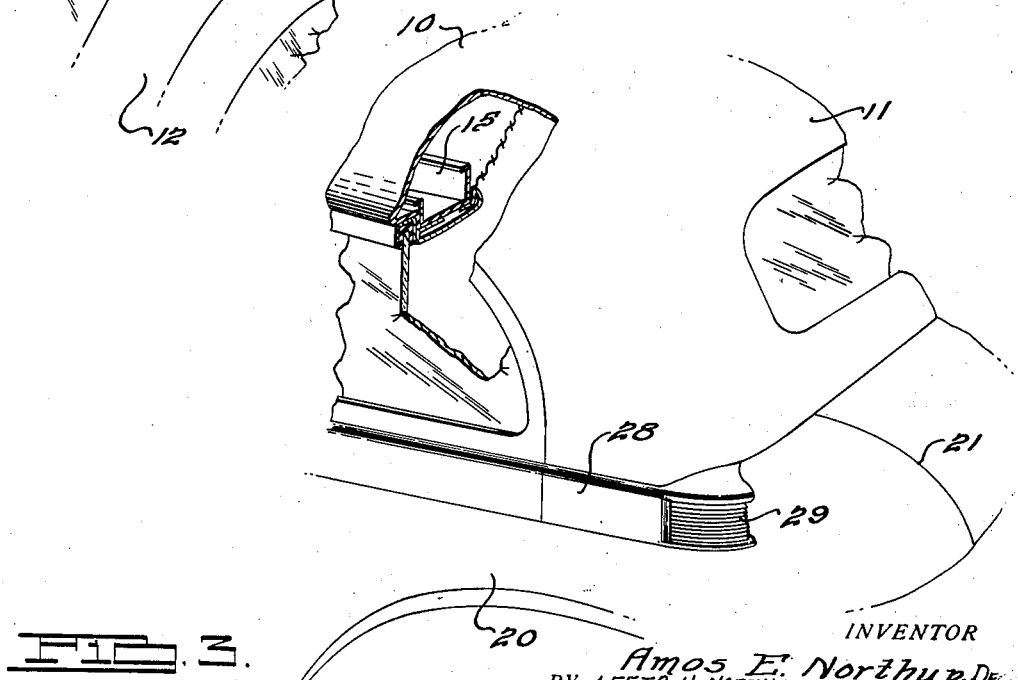
INVENTOR
Amos E. Northup, De
BY LEETA H. NORTHUP, ADMINISTRATRIX
BY—Harness, Dickey & Pierce.
ATTORNEYS.

Dec. 26, 1939.    A. E. NORTHUP    2,184,804
VEHICLE BODY CONSTRUCTION
Filed May 21, 1937    2 Sheets-Sheet 2
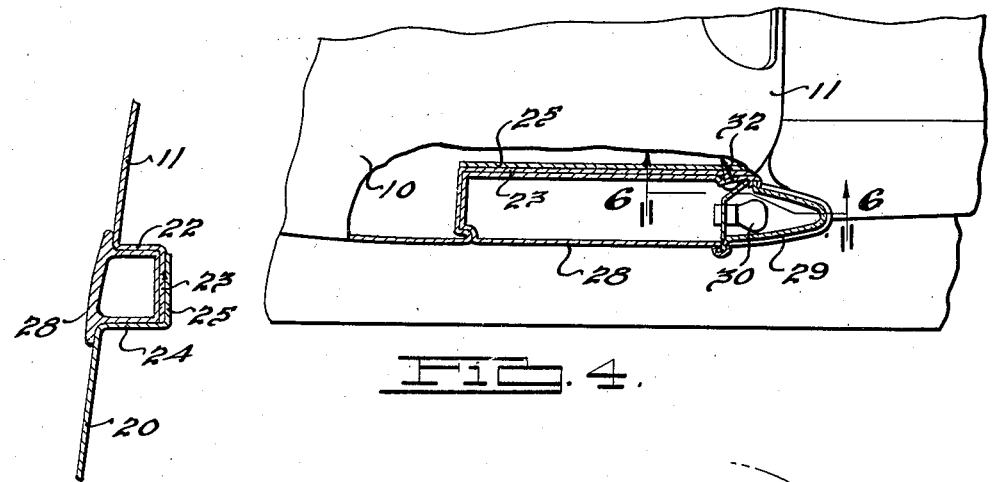
FIG. 4.
FIG. 5.
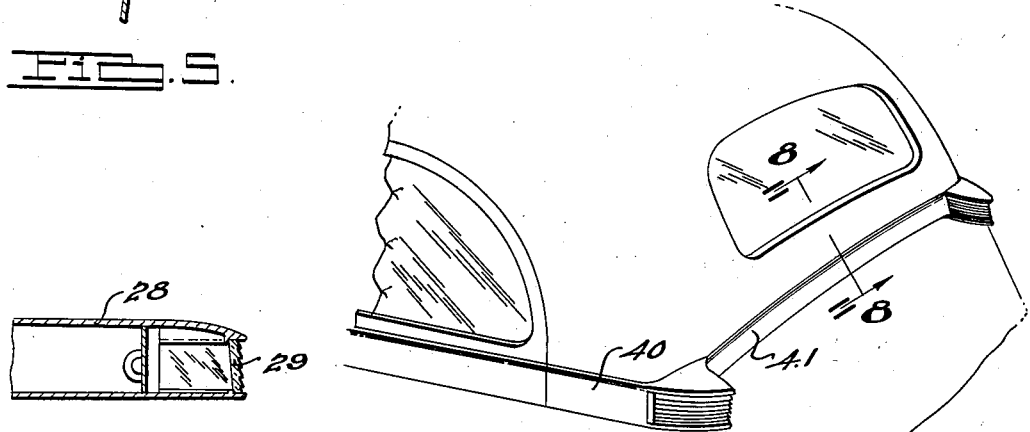
FIG. 6.
FIG. 7.
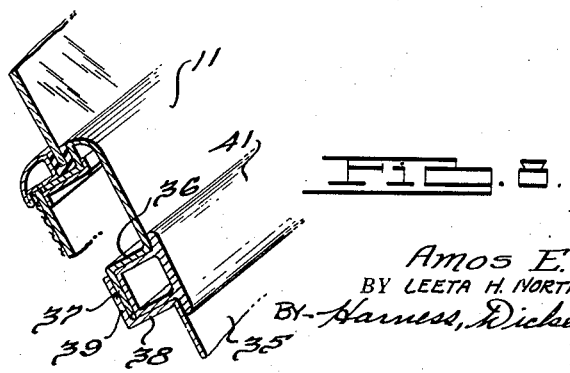
FIG. 8.
INVENTOR
Amos E. Northup, Dec'd
BY LEETA H. NORTHUP, ADMINISTRATRIX
BY Harness, Dickey & Pierce.
ATTORNEYS.

Patented Dec. 26, 1939

2,184,804

UNITED STATES PATENT OFFICE 2,184,804

VEHICLE BODY CONSTRUCTION

Amos E. Northup, deceased, late of Pleasant Ridge, Mich., by Leeta H. Northup, administratrix, Pleasant Ridge, Mich., assignor to The Murray Corporation of America, a corporation of Delaware Application May 21, 1937, Serial No. 143,915

2 Claims. (Cl. 296—30)

This invention relates to vehicle body constructions. More particularly it relates to a novel form of vehicle body construction in which simple and effective means are provided for joining the rear quarter panel of a vehicle body to the body paneling thereof to provide a neat, simple, and attractive joint structure.

Vehicle bodies, as are now conventionally manufactured, generally comprise a roof panel formed of a single integral sheet metal stamping and embodying the rear quarter panel down to the belt line of the body as an integral part thereof. It is conventional in constructions of this general character to flange the roof panel in its side marginal edges in order that it may mate with and be secured to the roof rails or other reinforcing structures which extend longitudinally of the body at the sides thereof. In the fabrication of vehicle bodies of this generic type, considerable difficulty has been experienced in obtaining an accurate mating of the rear marginal edge of the rear quarter panel with the body paneling.

It is a primary object of this invention to provide a joint structure for securing the rear or lower marginal edge of the rear quarter panel of a vehicle to the adjacent body paneling in such a manner that relatively greater variations may be absorbed even in the event that the panels do not mate with precision, the joint therebetween will be extremely strong and provide an attractive reveal surface.

Automotive vehicle bodies to which the inventive features of the present application are applicable are of two distinct types, the first being that type which includes a trunk or rear deck door built into the body structure and the second being that type of vehicle in which the body paneling extends completely across the rear of the vehicle and in which no provision for a deck door is made. In the type of body having a deck door or rear compartment, the deck door may be hinged directly to the rear marginal edge of the roof paneling and, consequently, no body paneling is provided at the rear of the vehicle. Consequently, the only joints made between the rear quarter panel and the body paneling are at the sides of the vehicle. The present invention contemplates a construction in which the edges of both the body panels and the rear quarter panel are offset inwardly and provided with over-lapping mating flanges which when secured together provide a channel presenting outwardly of the vehicle body. The present invention contemplates the provision of a generally tubular rear lamp housing adapted to seat in the channel thus formed for the purpose of not only providing a rear light but also for the purpose of hiding and concealing the joint formed between the panels.

The body paneling extends across the entire rear surface of the vehicle. The upper marginal edge of this body paneling is inwardly offset and flanged to mate with a complemental inwardly offset flange formed on the rear quarter panel and a similar strip of generally box section is inserted in the channel thus formed to reinforce and conceal the joints between the panels at this point.

It is a still further object of the present invention to provide a vehicle body construction in which the joint between the body paneling and the rear quarter panel of the top is formed in such a manner that considerable tolerance may be had for securing the parts in assembled relation without in any way impairing the reveal surfaces provided.

Many other and further objects of the present invention will become clearly apparent from the following specification when considered in connection with the accompanying drawings forming a part thereof.

In the drawings:

Figure 1 illustrates a vehicle body embodying the improvements of the present invention.

Fig. 2 is a fragmentary perspective view with parts broken away and parts in section showing the manner in which the roof panel mates with and is secured to the side rails of the vehicle body adjacent the front thereof.

Fig. 3 is a fragmentary perspective view of the rear quarter of the improved body illustrating in detail the manner in which the improved lamp housing is mounted in place and also illustrating the manner in which the roof panel mates with the side rails of the vehicle body.

Fig. 4 is a fragmentary top plan view taken substantially on the line 4—4 of Fig. 1 illustrating in detail the construction of the improved lamp housing and the manner in which the same is mounted in the vehicle body.

Fig. 5 is a fragmentary transverse sectional view taken on the line 5—5 of Fig. 1 illustrating in detail the cross sectional configuration of the lamp housing and further illustrating the manner in which the marginal edges of the rear quarter panel and side panel of the body are secured together.

Fig. 6 is a longitudinal sectional view taken substantially on the line 6—6 of Fig. 4 illustrating in detail the rear portion of the lamp housing structure.

Fig. 7 is a fragmentary perspective view of the rear portion of a vehicle body embodying the modified form of the present invention.

Fig. 8 is a fragmentary perspective view with parts in section illustrating the improved joint between the body paneling and the rear marginal edge of the rear quarter panel.

With more particular reference to the exact forms of the invention shown in the drawings, it will be readily understood that the invention finds particular practical utility in connection with the fabrication of vehicle bodies of the sedan type such as is shown in Fig. 1 of the drawings. Bodies of this general character include a roof panel 10 which embodies a rear quarter panel 11 as an integral part thereof. This roof structure is preferably formed from a single integral sheet metal stamping and may, as an integral part of such stamping, include pillars 12 at the lateral sides of a windshield opening 13 as well as the cowl top 14 of the vehicle.

As is conventional in body structures of this general type, the pillars 12 are reinforced by suitable members (not shown) which are connected to generally arched, longitudinally extending side rails 15 which run throughout the length of the top of the vehicle and serve to reinforce the roof structure 10. These side rails are formed of such cross sectional configuration that they are adapted, together with the lateral side edges of the roof panel 10, to provide jamb faces for the door openings of the vehicle.

As is clearly seen by reference to Figs. 2 and 3, the side marginal edges of the roof panel are bent inwardly thence downwardly to provide a flange 16 adapted to mate with the roof rail 15 and their extreme marginal edges and bent inwardly to provide a flange 17 which mates with the under side of the roof rail 15 in order that the roof panel as a whole may be positioned with extreme accuracy in order that the size and shape of the door openings may be accurately maintained. These roof rails are, of course, supported by the body structure as a whole and, consequently, their relative position with respect to the vehicle body paneling is fixed thus not only the body panels but the roof panels must be formed with extreme accuracy in order to obtain proper mating of the rear marginal edges of the rear quarter panel and the roof with the adjacent body paneling.

In the form of the invention shown in Figs. 1 to 6, inclusive, the body is formed to provide side panels 20 at the rear thereof which extend from the rear marginal edge of the rear door opening rearwardly to terminate along substantially the line 21 to define the marginal edge of a trunk compartment such as is conventionally formed in many types of vehicle bodies.

Inasmuch as the panels 21 are fixed to the body structure, considerable difficulty has been encountered in obtaining an accurate finished joint between the body panels 20 and the rear quarter panel 11. In order to overcome this difficulty, applicant provides a structure in which the lower marginal edge of the rear quarter panel throughout the zone in which it is adapted to mate with the body panel 20 is offset a substantial distance inwardly at the point 22 and is provided with a downwardly directed flange 23 which flange lies substantially in a plane substantially parallel to the panel 11. Likewise, the upper marginal edge of the body panel 20 throughout the zone with which it mates with the rear quarter panel 11 is offset inwardly as at 24 and provided with an upwardly extending flange 25 adapted to mate in over-lapping relation with the flange 23. It will be readily apparent by reference to Figs. 4 and 5 of the drawings that this structure will provide a relatively deep and wide outwardly presenting channel at the point where these panels are joined. It will likewise be seen that due to the fact that the flanges 23 and 25 overlap throughout a substantial distance that the width of this channel may vary throughout a relatively wide range and yet at the same time provide a satisfactory joint between the panels. It will be understood that any inaccuracies in the mating of the parts 11 and 20 will merely result in a slight variation in the width of the channel formed at the joint therebetween without in any way materially affecting the strength of this joint.

In order to hide and conceal the joint between the panels thus formed, applicant provides a generally tubular lamp housing 28 adapted to seat in the channel formed at this joint and formed to provide an attractive appearance for the reveal surface of the panels at the joint. The housing 28 may be formed of a cross sectional configuration such as is clearly illustrated in Fig. 5 whereby portions of this housing overlie the reveal surfaces of the panels 11 and 20 in order that the exterior appearances of the completed vehicle bodies will be substantially identical although the width of the channel formed at the joint may vary to some substantial extent. The lamp housing 28 has a glass lens 29 of suitable construction mounted therein which lens surrounds a bulb 30 which may be controlled from the dash of the vehicle to illuminate the rear of the vehicle as is conventional in constructions of this general character. The lamp housing 28 may be conveniently locked in position in the channels by means of screws 32.

In the form of the invention illustrated in Figs. 7 and 8, the body paneling of the vehicle is formed from either a single panel or a plurality of panels 35 which extend from the rear sides of the rear door openings completely around the rear of the vehicle and, consequently, it is essential that a substantially similar joint structure be maintained throughout the entire mating zone of these panels. In order to achieve this end, not only the side portions of the rear quarter panel but also the rear portions thereof are provided with an inward offset 36 adjacent the rear marginal edges thereof which offset has a downwardly extending flange 37 formed thereon.

Likewise, the body panel 35 is offset inwardly at 38 and is provided with an upwardly extending flange 39 adapted to mate in over-lapping relation with the downwardly extending flange 37 thus providing an outwardly presenting channel completely around the rear marginal edge of the rear quarter panel of the vehicle. Lamp housings 40, substantially similar in construction to the lamp housings 28 described above, are secured in position in this channel at the sides of the rear quarter panel and a generally tubular filler strip 41 extends across the rear of the vehicle between the lamp housings to hide and conceal the joint between the panels at this point and provide an attractive reveal surface of the vehicle as a whole. The lamp housings as well as the filler strip 41 may be formed in such a manner that portions thereof overlie the adjacent reveal surfaces of the panels 11 and 35 in order to compensate for varying widths of the channel and provide the same ornamental exterior appearance in substantially all cases.

While but two specific embodiments of the invention have been illustrated and described, many other and further modifications thereof falling within the scope of the invention as defined in the subjoined claims will be clearly apparent to those skilled in the art.

What is claimed is:

1. A vehicle body construction including in combination, a roof panel having a rear quarter panel formed as an integral part thereof, a downwardly extending flange at the lower marginal edge thereof, a side panel having an upwardly extending flange at the upper marginal edge thereof, said flanges overlapping, said panels being secured together through said flanges, a generally tubular lamp housing secured to said panels and serving to conceal the joint provided by said mating flanges, and a lamp within said lamp housing.

2. A vehicle body construction including in combination, a roof panel having a rear quarter panel formed as an integral part thereof, the lower marginal edge of said rear quarter panel being offset inwardly and being provided with a generally downwardly extending flange, a rear body panel having its upper marginal edge offset inwardly and being provided with a generally upwardly projecting flange adapted to mate with the flange on said rear quarter panel in overlapping relation, said panels being secured together through said mating flanges whereby said offsets serve to provide an outwardly presented channel, and a generally tubular lamp housing secured in said channel serving to conceal the joint between said flanges.

LEETA H. NORTHUP,
*Administratrix of the Estate of Amos E. Northup, Deceased.*